United States Patent [19]

Morwing et al.

[11] Patent Number: 4,628,319
[45] Date of Patent: Dec. 9, 1986

[54] NAVIGATION SYSTEM

[75] Inventors: Bo A. Morwing, Åsa Stn; Bengt L. Andersson, Lindome; Per-Olof G. Gustavsson, Mölnlycke, all of Sweden

[73] Assignee: Telefonaktiebolaget L M Ericsson, Stockholm, Sweden

[21] Appl. No.: 514,827

[22] PCT Filed: Nov. 2, 1982

[86] PCT No.: PCT/SE82/00364
§ 371 Date: Jun. 16, 1983
§ 102(e) Date: Jun. 16, 1983

[87] PCT Pub. No.: WO83/01838
PCT Pub. Date: May 26, 1983

[30] Foreign Application Priority Data

Nov. 16, 1981 [SE] Sweden .................................. 8106798

[51] Int. Cl.⁴ ........................ G01S 13/80; G01S 13/74
[52] U.S. Cl. ..................................................... 342/46
[58] Field of Search ........................ 343/6.5 R, 6.8 R

[56] References Cited

U.S. PATENT DOCUMENTS

| | | | |
|---|---|---|---|
| 2,586,888 | 2/1952 | Varela | 343/6.5 R |
| 2,640,983 | 6/1953 | Stokes et al. | 343/6.5 R |
| 3,087,153 | 4/1963 | Richards | 343/6.8 R X |
| 3,312,970 | 4/1967 | Bond | 343/6.5 R |
| 3,969,725 | 7/1976 | Couvillon et al. | 343/6.5 R |
| 4,006,477 | 2/1977 | Yost, Jr. et al. | 343/6.8 R |
| 4,047,171 | 9/1977 | Fugit | 343/6.8 R |

Primary Examiner—T. H. Tubbesing
Assistant Examiner—Gilberto Barrón, Jr.
Attorney, Agent, or Firm—Roberts, Spiecens & Cohen

[57] ABSTRACT

A navigation system including at least one pulse radar and a number of transponders which when receiving radar pulses transmit high frequency pulse modulated signals. When receiving an interrogating signal from the pulse radar the transponder transmits a response signal with a delay. The delay is selected in such a manner that the response signal arrives at the pulse radar within a time space lying between the moment when all signal echos, lying within a definite range, have been received and the moment when the next radar pulse begins. The display scan in the radar is delayed by the same value as the response signal. In this way the response signal competes with considerably weaker echo signals than in the case of a non delayed response.

9 Claims, 6 Drawing Figures

NAVIGATION SYSTEM

FIELD OF INVENTION

The present invention relates to a navigation system including at least one vessel-borne radar arrangement and at least one radar beacon which when receiving radar pulses transmits high frequency, pulse modulated response signals.

BACKGROUND

In most of known navigation systems of the above said type, the radar beacon responds at a frequency which is near the frequency of the received radar pulse and the response signal is presented on a display superposed on the normal radar image. An important problem is that powerful ground return, rain- and sea clutter can completely or partially mask the signal of the transponder particularly if the transponder is situated a short distance away. The fact that the signal of the radar beacon is superposed on the normal radar display may also allow the response signal hide other echos of interest which is also considered as a drawback. For civil-maritime radar communication there are two allotted frequency bands, the so-called 3 cm. band or X-band between 9300 and 9500 MHz and the so-called 10 cm. band or S-band between 2900 and 3100 MHz.

In the case of so-called permanent frequency radar beacons, these transmit, when detecting a radar pulse, a response pulse with a permanent frequency, for example, in the lower part of said frequency band. The vessel-borne radar can be readjusted for receiving such signal and in this way there is made an attempt to distinguish the response signal from disturbing signals possibly arising in consequence of the transmitted radar signal. However, in a vessel-borne radar with frequencies near the response frequency, disturbing signals also arise at the response frequency in the form of ground- and sea clutter. The reason is that the transmitted radar signal and consequently the clutter is broad in frequency and thus the clutter will be situated within the frequency range of the transponder. Furthermore, the radar receiver has a finite attenuation for the clutter frequency even when the receiver is adjusted to the response frequency. For these radars also an effective receiver selection is necessary in order to prevent racon signals at from resulting in interference on the normal radar display. Another drawback, is when the radar and the radar beacon are transmitting with different frequencies, is that the majority of radar aerials existing today are of the "end fed slotted waveguide" type which has the characteristics that the direction of the aerial beam is frequency dependent and varies at 0.8°–1.0°/100 MHz. This can result in a deviation of bearing to the radar beacon and furthermore in a strongly reduced range of the same.

Another approach is the so-called frequency offset method in which the response transmitter answers with a definite frequency which is for example 50 MHz below the frequency transmitted from the radar. Also in this case the interference signal arises for the same reasons as mentioned above in connection with permanent frequency radar beacons. Reference is made, for example, Conceptual Radar Piloting Techniques Using Radar Beacon (Racon) Technology and Other Advanced Marine Radar Technology, E. F. Greneker and J. E. Metthews, Georgia Institute of Technology, April 1981 and Fixed Frequency Racon, a performance analysis prepared for the Swedish Administration of Shipping and Navigation, by Bo Morwing and P. O. Gustavsson.

SUMMARY OF THE INVENTION

An object of the present invention is to obtain a clutter free receiving of response signals of the above indicated type and this is achieved due to the fact that receiving is carried out when clutter occurs in a minimal extension. It is a further object to allow the transponder according to the invention to function together with existing conventional vessel-borne radar equipments of arbitrary type as well as with vessel-borne radar equipment which by means of code signals can readjust the transponder to the transmitting mode according to the invention.

BRIEF DESCRIPTION OF DRAWINGS

The invention will next be described with reference to the attached drawing in which.

DETAILED DESCRIPTION

Figure 1:
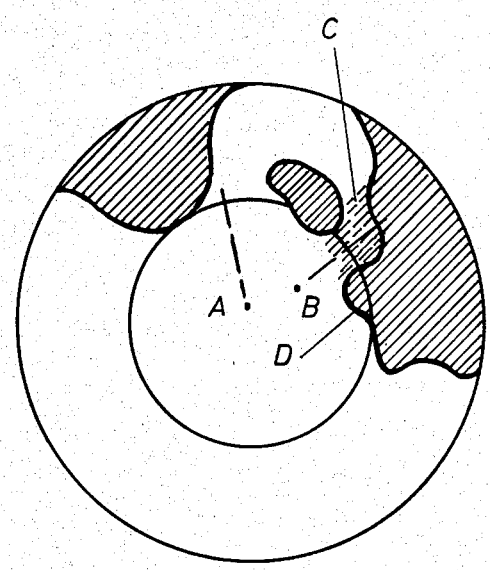
FIG. 1 shows the display of a vessel-borne radar during conventional reception.

FIG. 1 shows diagrammatically the display of a vessel-borne radar with response signals from two transponders A and B which are coded with Morse-Code signals w and k respectively. By C is designated rain reflections or so called rain clutter and by D is designated a stretch of coast line which causes strong ground return on the display. As a consequence, the response signal from the responder B will be difficult to distinguish due to the rain clutter and part of the response signal will be drowned by the ground return from land.

The known methods for eliminating such drawback are based on the principle that the response signal has another frequency than the frequency transmitted from the vessel-borne radar. They give, however, no satisfying solution for distinguishing the response signals and the received echos.

Figure 2:
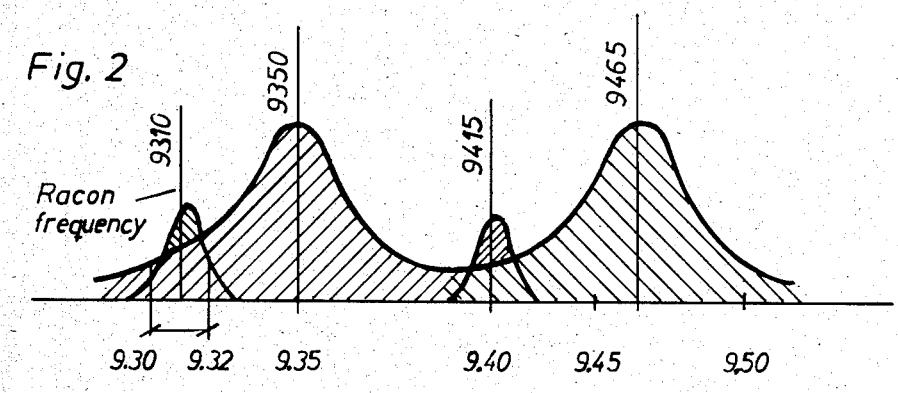
FIG. 2 is a frequency diagram showing the spectrum of the vessel-borne radar and of the response signal in case of permanent frequency answer and displaced frequency answer respectively.

FIG. 2 shows a frequency spectrum in the so-called X-band between 9300 and 9500 MHz used for civil-maritime radar traffic where x=9300–9320 MHz is disposed for permanent frequency racons. According to the permanent frequency principle, the responder, when receiving the signal of the vessel radar, sends a response pulse with a definite frequency in the lower part of the band for example 9310 MHz. If the frequency of the vessel-borne radar is near this frequency for example 9350 MHz, a disturbing clutter can arise which can be of the same order of magnitude as the response signal and which masks the signal of the transponder as shown in FIG. 2. According to the so-called frequency offset principle the transponder sends its signal with a frequency which with a certain value, for example 50 MHz, is below the frequency of the vessel-borne radar which is for example 9465 MHz. In this case, it is also not possible to avoid clutter and masking of the signal of the transponder as appears from FIG. 2. Furthermore, in both these cases, a change in the existing radar equipment will be necessary if these are built only for receiving their own frequencies.

A fundamental idea of the invention consists in that the transponder, which can be of arbitrary type, (ie., can transmit with the received frequency, with a permanent frequency or with a frequency offset relatively to the received frequency) transmits its signal with a delay. The delay should be so large that the response signal arrives at the vessel radar at first when all echos within a definite range have arrived. In this way, the response signal only needs to complete with weaker echos and the risk of masking by clutter and other echos is strongly reduced.

Figure 3:
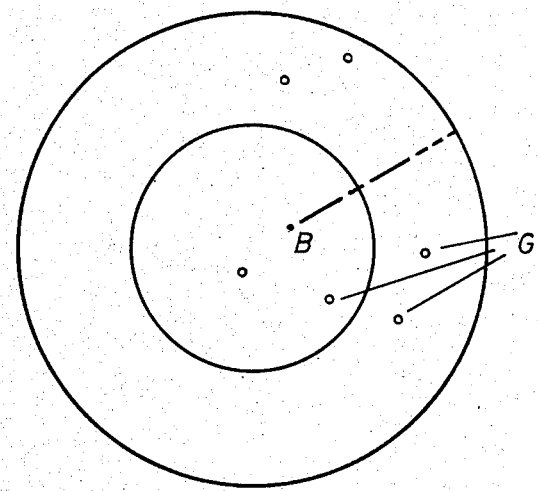
FIG. 3 shows the display of a vessel-borne radar according to the invention.

This appears from FIG. 3 which shows the same display as FIG. 1 with the difference that the transponder B in FIG. 1 has been equipped for sending a delayed response signal and the transmitter has been switched over to the transmitting mode according to the invention, whereby the scan is started with a delay. The signal from the transponder A will not be presented as it is of the conventional type and its response signal has been received before the display scan has started. The same concerns the rain clutter and the coast countour line D in FIG. 1. The signal from the transponder B which is delayed for a certain time will, however, be presented at the correct range from the display as the start of the display scan has been delayed during the same period of time as the signal of the transponder. As appears from FIG. 3, the response signal has been coded with an additional Morse-Code signal s (. . . ) which indicates that the response is coming from a transponder in delayed mode. G designates weak echos at a range corresponding to the delay range. These echos are thus presented at a false distance but this is without interest as the only purpose is to make it possible to distinguish the racon response at a correct range.

Figure 4:
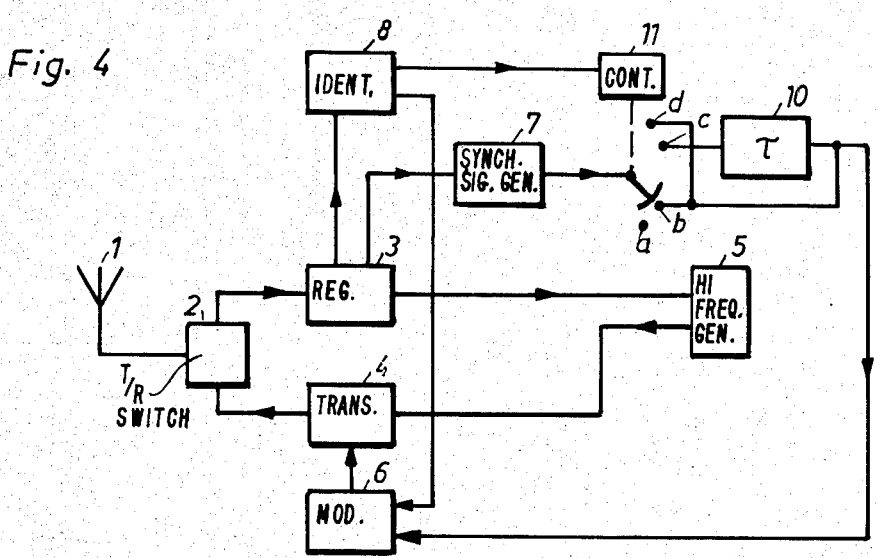
FIG. 4 is a block diagram of a transponder according to the invention.
Figure 5:
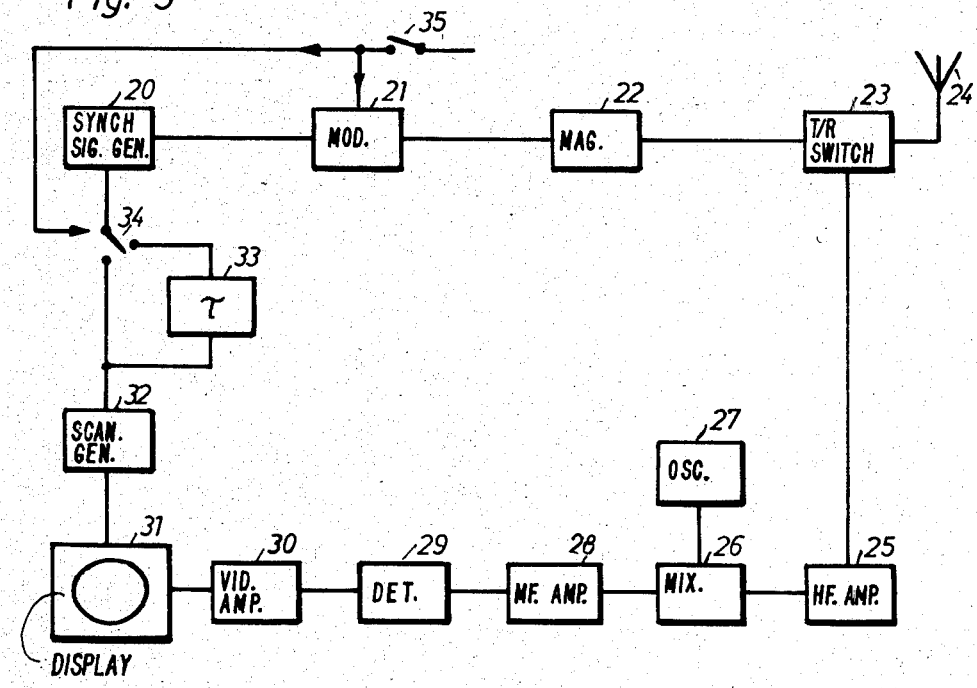
FIG. 5 is a block diagram of a vessel-borne radar according to the invention.

FIG. 4 shows diagramatically in a block diagram a transponder of the conventional type to which the idea of the invention has been applied. By 1 is designated an aerial, by 2 a transmitter/receiver switch and by 3 a receiver from which the received signals are supplied to a transmitter 4 through a high frequency generator 5. A modulator 6 is arranged for modulating the high frequency signal of the transmitter and the modulator is controlled by a synchronizing signal generator 7 activated by the received pulse signal.

Transponders of the above type are generally known and are described for example in Swedish Pat. No. 419,002. According to the invention, the transponder transmits a delayed response signal when identifying an interrogating signal from a vessel-borne radar which is equipped for receiving such a delayed response signal. By 8 is designated an identifier for interrogating signals which when receiving the interrogating signal affects through a control device 11 a symbolically indicated switch 9 for connecting a delay circuit 10 between the synchronizing signal, generator 7 and the modulator 6. By delaying the response signal the latter will be interpreted by the vessel-borne radar as if it should come from a greater distance than it comes from in reality. In order to prevent that the vessel-borne radar reproduces the response signal at an incorrect distance, it is provided with the same delay as the transponder so that the image appears at a correct distance while all other echos within a definite range disappear.

When for example the pulse repetition frequency is 1 KHz and the transponder and the radar scan are delayed by $0.5 \times 1$ PRF=0.5 ms., the answer from the responder will compete with radar echos lying further than $$(0.5 \times 10^{-3}/2) \times 3 \times 10^{-9} = 75 \text{ Km}.$$

which when having a distance of 1 Km. or less between transponder and vessel radar gives a relative improvement of the "tolerance against clutter" of the order of magnitude 75 dB.

In order to allow co-operation with a vessel radar which is not equipped with delay arrangements, the switch 9 in its other position shunts the delay circuit 10. FIG. 15 shows a conventional pulse radar including a synchronizing signal generator 20 which starts a modulator 21 for modulating the high frequency signals of a magnetron 22. The pulse modulated signals are supplied to an aerial 24 through a transmitter/receiver switch 23. On reception the target echo signal comes through the switch 23 to an HF amplifier 25 the output of which is supplied to a mixer 26 together with the signal from a local oscillator 27 and from the mixer the signal is supplied to an MF amplifier 28. Then the signal comes to a detector 29 and through a video amplifier 30 to the display 31. The synchronizing signal generator 20 activates a scan generator 32 which generates the scan of the display 31. It is also possible to let the transmission pulse trigger the scan generator indirectly. For making possible that this conventional device can work with a delay which corresponds to the delay of the transponder, a delay circuit 33 is connected which delays the scan signal with the same value as in the transponder. In order to switch over the transponder to transmission of the delayed response signal, the vessel-borne radar has to send an interrogating signal which for example can consist of a pulse series of special shape or a double pulse. When supposing that the interrogating signal consists of for example an extended pulse, this is represented by a switch 35 which when operating causes a special length of the modulating pulse and at the same time switches over a switch 34 in consequence of which the direct connection between the synchronizing signal generator 20 and the scan generator 32 is interrupted and the delay circuit 33 is connected between these generators. In consequence of this, only the signal from the transponder B will be represented on the display together with remote echos and the response signal from the transponder. A will be received before the scan of the display is started as mentioned in connection with FIG. 3.

In order to simplify the description, a vessel-borne radar has been chosen as an example and also transponders of the most simple form, where the response signal has the same frequency as the signal received from the vessel-borne radar. It is possible of course to apply the invention to arrangements of other types for example sweep frequency racon, permanent frequency racon or frequency offset racon.

It is possible that the transponder sends delayed signals only when receiving interrogating signals from the transmitter while otherwise it does not transmit any signals at all. This can be represented by a position of the switch 9 in which it is not connected with any contact.

On the other hand it is possible that both the undelayed and the delayed response signal are transmitted after each other and only the delayed signal is coded with a special character.

Figure 6:
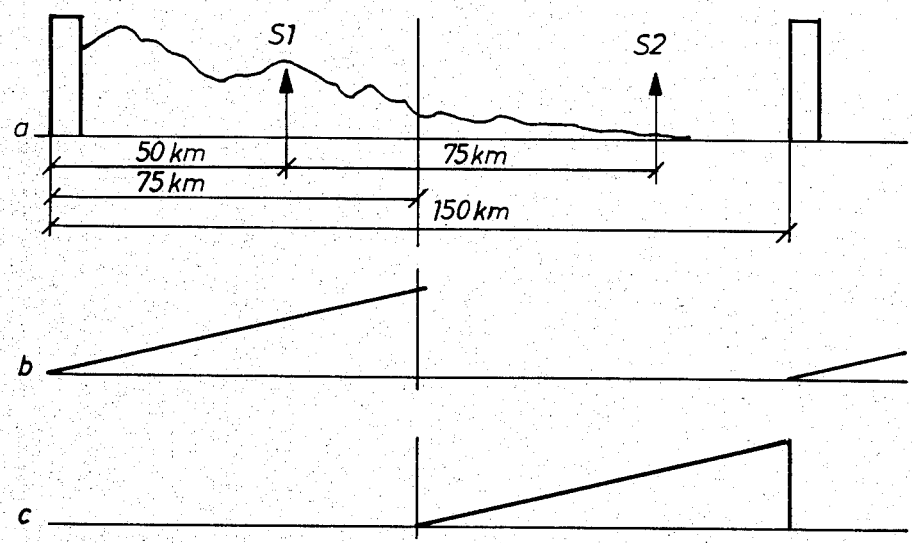
FIG. 6 is a range diagram showing the position of the response signal without using and with using the invention.

The alternatives above mentioned can be symbolized by the switch 9 which can connect the output of the synchronizing signal generator 7 to different contacts a–d. When contact a is connected, no signal is transmitted, when contact b is connected a normal response signal is transmitted which has no delay, when contact c is connected the response signal is transmitted delayed and when contact d is connected both the undelayed and the delayed signals are transmitted. Switching between these positions can be carried out by means of interrogating signals which correspond to the different positions and have for example different pulse frequencies, or also manually during the installation when known in which mode the equipment will work. FIG. 6 is a range diagram for a vessel-borne radar according to the invention. If the time space between two transmitted pulses is 1 ms. (1 KHz.PRF) this corresponds to a detectable range of 150 Km. As shown in the diagram, the echo signal decreases with distance but having a response signal S1 at a distance of for example 50 Km. this signal can be completely masked by the echo signals. If on the other hand the response signal is delayed so that it occurs in a moment corresponding to a distance 75 Km. larger S2, it will compete with considerably weaker echo signals. FIGS. 6b and 6c show the display scan in normal function and when delaying the vessel radar. It appears that with a delay of 0.5 ms. the contrast between the response signal and the disturbing echos increases considerably at the same time as the response signal is represented at a correct range.

What is claimed is:

1. A navigation system comprising at least one pulse radar means for transmitting interrogating radar pulses of determinable repetition period and including a display means for making a display of echo signals which may include reflected signals, and at least one transponder means for receiving radar pulses and for transmitting in response to said pulses high frequency pulse modulated response signals, the transponder means including delay means and means associated with delay means for transmitting, on receiving an interrogating signal from the pulse radar means, response signals with a delay such that response signals from the said transponder means are displayed on the display with displacement relative to the position that the response signals would be displayed without said delay, said radar means including means for generating a scan on said display means and delay means for delaying the start of the scan by the same value as the delay of the response signal whereby the echo signals which are received from objects within a predetermined range of said pulse radar means are received before the start of the scan and thus are not shown whereas response signals from the transponder are displayed in the display, both said delay means providing respective delays of equal value and of such substantial fraction of the repetition period as to eliminate all but the strongest echo signals received after the start of the scan.

2. A navigation system according to claim 1 wherein the transponder means includes switching means which in response to an interrogating signal switches over the transponder means from a rest condition to a working condition in which a delayed response signal is transmitted.

3. A navigation system according to claim 2, wherein the transponder means includes sending means which in rest condition respond to a received radar pulse without said delay.

4. A navigation system according to claim 2, wherein the transponder means includes sending means which in rest condition do not transmit any signals.

5. A navigation system according to claim 2, wherein the switching means includes means controlling the transponder means to transmit undelayed as well as delayed response signals.

6. A navigation system according to claim 1, wherein the radar and transponder means includes means such that the said delay corresponds to part of the time space betwen two sequentially transmitted radar pulses.

7. A navigation system according to claim 6, wherein the latter said means are such that the said delay corresponds to about half of the time space between two radar pulses.

8. A navigation system according to claim 2, comprising control means for setting the switching means to respond to a received interrogating signal.

9. A navigation system according to claim 1 wherein said switching means includes means for the manual adjustment of the switching means.

* * * * *